Jan. 24, 1961

J. J. GOETT 2,969,310

NEUTRONIC REACTOR SYSTEM

Filed April 18, 1945

Witnesses:
Herbert E Metcalf
William J. Ruano

Inventor:
John J. Goett
By: Robert A. Lavender
Attorney

Jan. 24, 1961 J. J. GOETT 2,969,310
NEUTRONIC REACTOR SYSTEM
Filed April 18, 1945 3 Sheets-Sheet 3

Witnesses:
Herbert E. Metcalf
William J. Ruano

Inventor:
John J. Goett
By Robert A. Zavender
Attorney.

United States Patent Office 2,969,310
Patented Jan. 24, 1961

2,969,310
NEUTRONIC REACTOR SYSTEMS

John J. Goett, Chicago, Ill., assignor to the United States of America as represented by the United States Atomic Energy Commission Filed Apr. 18, 1945, Ser. No. 588,984

3 Claims. (Cl. 204—193.2)

My invention relates to the separation of matter and particularly to the separation from deuterium oxide of uranium solids suspended in said deuterium oxide.

It is known that element $94^{239}$, usually referred to as plutonium, can be produced in a device known as a neutronic reactor. In such a device, which includes a uranous material and a neutron slowing material or moderator, the isotope $U^{235}$ can be split or fissioned by bombardment with thermal neutrons, i.e., neutrons in thermal equilibrium with the surrounding medium, to provide a self-sustaining chain reacting system. In a properly designed neutronic reactor the fission neutrons produced give rise to new fission neutrons in sufficiently large numbers to overcome the neutron losses in the reactor. However, most of the neutrons arising from the fission process are set free with a very high energy and must be slowed down to thermal energies by a moderator before they are most effective to produce fresh fission by bombardment of additional $U^{235}$ atoms. The moderator used must effectively slow the neutrons to thermal energies without much absorption by the moderator; and then the neutrons must enter the uranium. Deuterium in the form of deuterium oxide or heavy water is an ideal moderator in that it has the ability to slow fast neutrons to thermal energy levels with very few collisions and in that it has a very low neutron capture cross-section for thermal neutrons.

During the interchange of neutrons from their point of origin to their point of utilization in fission, neutrons may be lost in four ways; by absorption in the uranium metal or compound, by absorption in the moderator, by absorption in impurities present in the system, and by leakage from the system. Natural uranium and its compounds have a ratio of $U^{235}$ isotope to $U^{238}$ isotope of 1 to 139. Particularly because of this $U^{238}$ content, natural uranium has an especially strong absorbing power for neutrons when they have been slowed down to moderate velocities or so called resonance energies. The absorption in uranium at these energies is termed the uranium resonance absorption or capture. Neutron capture by the isotope $U^{238}$ does not result in fission but rather in the creation of $92^{239}$ which by successive loss of beta particles transforms to $93^{239}$ and $94^{239}$, respectively. The element $94^{239}$ is a relatively stable nucleus that is fissionable by thermal neutrons in a similar manner to the response of $U^{235}$ to thermal neutrons.

The capture of neutrons by the $U^{235}$ content of natural uranium, not only releases neutrons for maintaining the self-sustaining chain reaction, but also releases fission fragments or products comprising new elements in accordance with the following reaction:

$92U^{235}$+neutron→$A$+$B$+about 2 neutrons (average)

where

"A" represents "light" fission fragments having atomic masses ranging from 83 to 99 inclusive and atomic numbers from 34 to 45 inclusive; for example, Br, Kr, Rb, Sr, Y, Zr, Cb, Mo, Ma, Ru, and Rh;

and

"B" represents "heavy" fission fragments having atomic masses ranging from 127 to 141 inclusive, and atomic numbers from 51 to 60 inclusive; for example, Sb, Te, I, Xe, Cs, Ba, La, Ce, Pr, and Nd.

These fission fragments are highly radioactive with the emission of gamma rays and considerable heat. They are useful as sources of gamma radiation such as for use in X-ray therapy, for radiographic work, and other purposes. Because of the high gamma ray activity precautions must be taken to shield personnel from the effects of said fission fragments.

These products of the neutronic reactor, i.e., $92^{239}$, $93^{239}$ and $94^{239}$ are formed in the uranium while in situ and means must be provided for removing the irradiated uranium from the reactor in order that these reaction products can be separated from the uranium. The uranium compounds used with or without the reaction products included, are hereinafter called uranous material. A more detailed description of the neutronic reaction will be found in a copending application of Gale Young, Serial No. 552,730, filed September 5, 1944, now Patent 2,774,730, dated December 18, 1956.

In one form of neutronic reactor with which the invention is particularly useful, the uranous material is in the form of uranium oxide, such as $UO_2$, $UO_3$ or $U_3O_8$, or as a carbide or uranate. This uranous material in a finely divided state with a preferred original particle size below 2 microns is suspended in the neuterium oxide moderator to form a slurry which is circulated through the reactor and a heat exchange system. Because of abrasion between particles, the particle size will gradually diminish as the material circulates through the neutronic reactor and the circulatory system. If $UO_2$ is used as the uranous material of the slurry, the preferred ratio by weight is one part oxide to four parts heavy water. On a volume basis, the oxide solids represent about 4 percent of the slurry volume.

The slurry is placed in a reaction tank of sufficient size to contain enough slurry to maintain a chain reaction, and means are provided for withdrawing a portion of the slurry from the tank when the uranous material has received sufficient neutron bombardment to produce the desired amount of fission products and plutonium. The slurry solids must then be separated from the deuterium oxide for further processing during which the fission products and plutonium are finally separated out. For several reasons, it is important that the separation of slurry solids from the deuterium oxide be conducted as quickly as possible. In the first place, as has been pointed out, considerable heat is evolved in the irradiated slurry, and it is an object of this invention to use this self-heat in the separation process. The self-heat if uncontrolled will cake the slurry making it difficult to handle and may even cause the slurry to reach a temperature at which it may damage the separation apparatus. It may also be desirable to recover the fission products before any substantial radioactive decay has occurred, so that these products may be used while in a highly radioactive state. Another reason for quick separation is the very high cost of deuterium oxide. A certain minimum amount of deuterium oxide must remain in the neutronic reactor, if the chain reaction is to continue. Therefore, the shorter the time of hold-up of the deuterium oxide outside the reactor while being separated, the smaller the amount of said oxide necessary for the entire system.

Another object of my invention is to provide a method and apparatus whereby radioactive solids in suspension in a liquid may be quickly separated from said liquid.

Still another object of my invention is to provide a method and apparatus whereby uranous solids in suspension in deuterium oxide may be quickly and efficiently separated from said deuterium oxide.

Other objects will become apparent upon reading the description that follows.

In one embodiment of my invention the uranium slurry after irradiation in the reactor is passed onto a conveyor in which the self-heating of the activated slurry raises the temperature of the slurry above the boiling point of deuterium oxide. The deuterium oxide is then conducted off as a vapor to a condenser where it is condensed to a liquid and returned to the reactor, while the temperature of the solid is maintained below its combustion temperature, the dried uranium solids being conveyed away from the reactor for further treatment.

The invention will be readily understood by those skilled in the art by reading the following description of two embodiments of the invention in conjunction with the accompanying drawings in which.

Figure 1:
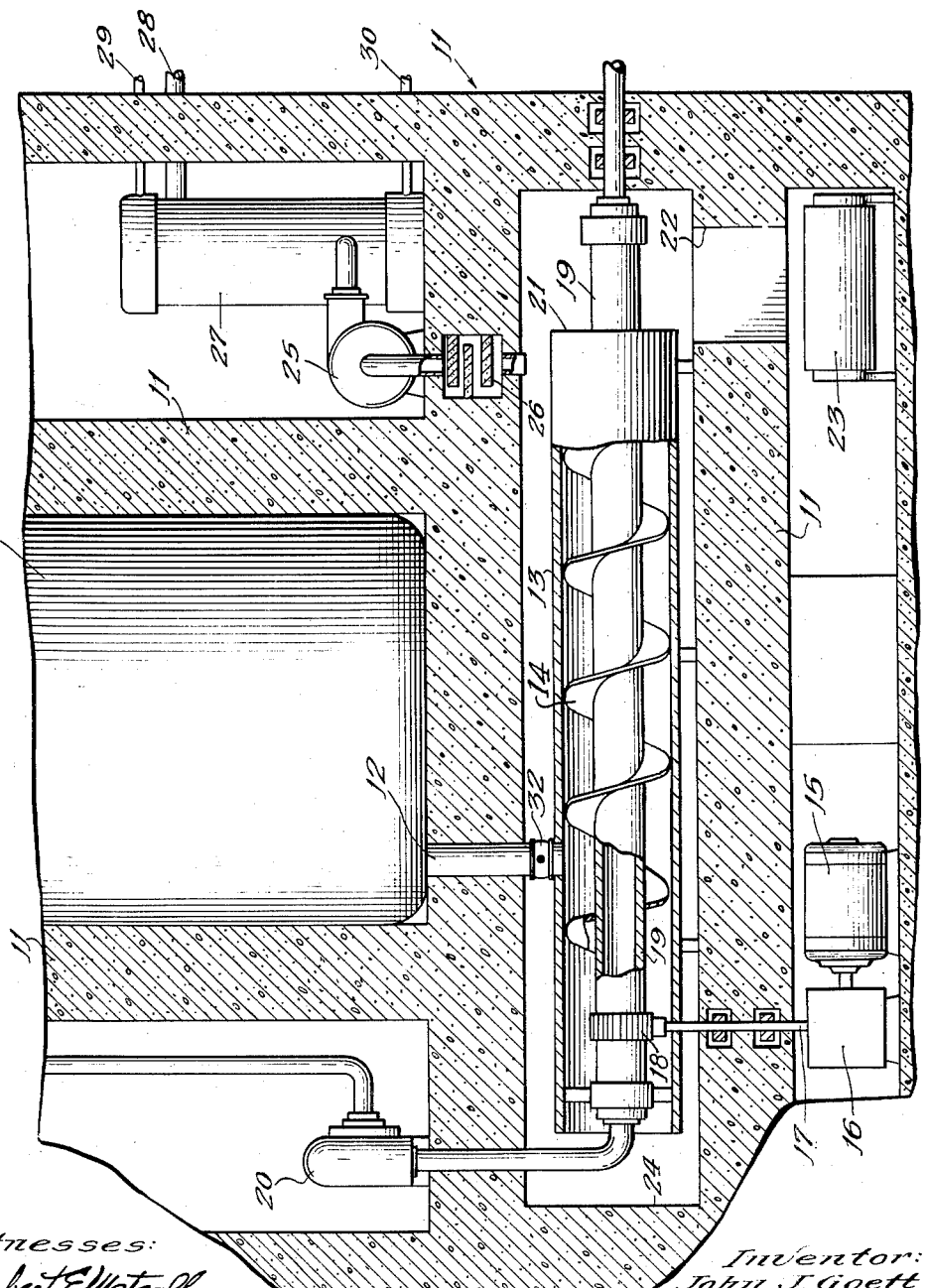
Fig. 1 is a vertical sectional view partially in section of one embodiment of the invention.

Turning now to Fig. 1, a portion of a tank 10 of a neutronic reactor is shown. Tank 10 contains a slurry of finely divided uranium dioxide, $UO_2$, in deuterium oxide, in sufficient quantity and proportions and of proper overall shape to provide a self-sustaining neutronic chain reaction.

Surrounding and supporting tank 10 is a concrete shield generally indicated at 11 divided into several compartments so that the radioactive parts of the system are separated from the non-radioactive parts. Each wall and the base of shield 11 is approximately five feet in thickness, which thickness has been found sufficient to absorb enough of the radioactivity around a reactor of this type so that personnel may safely be stationed on the outside of said shield. An outlet pipe 12 connects tank 10 to a stationary elongated tube 13 in which the separation of uranous solids from deuterium oxide takes place. A valve 32 which may be operated from outside the shield (by means not shown) controls the flow of slurry from tank 10. Inside tube 13, a screw conveyor 14 is rotated by an electric motor 15 through reduction gears 16, shaft 17 and bevel gears 18. The hollow central shaft 19 of screw conveyor 14 is connected to a pump 20 that circulates cooling fluid through the said central shaft 19, said cooling fluid being returned to pump 20 through a return line and a heat exchanger, not shown.

Tube 13 is open on both ends so that solid material may be conveyed to the end 21 where it falls through an opening 22 in shield 11 on a conveyor 23 that carries it to the next step of the plutonium recovery process.

A small negative pressure is maintained in the chamber 24, which surrounds tube 13, by means of an exhaust pump 25 that draws the mixture of air and deuterium oxide vapor from chamber 24 past baffles 26 and into a condenser 27. The liquid deuterium oxide leaves the condenser 27 through pipe 28 and is returned to the neutronic reactor tank 10 while cooling fluid is circulated through the condenser 27 by means of pipes 29 and 30. All parts contacted by the uranous material or the deuterium oxide are preferably of stainless steel.

The operation of the separation process is as follows: The neutronic reactor is operated for a period of time necessary to provide the desired concentration of plutonium. At this time, valve 32 is opened allowing a portion of the irradiated slurry to flow into tube 13. The flow of cooling fluid, which fluid may be any suitable refrigerant, is adjusted by a valve, not shown, to allow the temperature of the uranous material to rise to a point not over approximately 600° C. At this temperature, the solids will be completely dehydrated and all the hydrates that may have formed are completely decomposed. At 600° C., $UO_2$, $UO_3$ or $UO_4$ will be converted to $U_3O_8$ in the form of a soft, friable mass, relatively porous and possessing little mechanical strength, so that said mass may be slowly moved by the screw conveyor 14 to the end of the tube 13 at which point the material falls on the conveyor 23.

The deuterium oxide vaporizes at slightly over 100° C., flows out of tube 13 and is exhausted from chamber 24 by exhaust pump 25 through baffles 26, which baffles catch any entrained solid particles that may be carried with the vaporized deuterium oxide. The deuterium oxide is then pumped into the condenser, condensed to a liquid state and finally mixed with fresh uranous material and returned to the neutronic reactor tank 10.

In the meantime fresh slurry has been added to tank 10 as irradiated slurry is withdrawn so that the neutronic chain reaction is maintained. A small amount of irradiated slurry may be withdrawn continuously from tank 10 to tube 13 or the separation may be conducted in batches, by withdrawing a larger amount of slurry, closing valve 32 and refilling the tank 10 to the original level.

Figure 2:
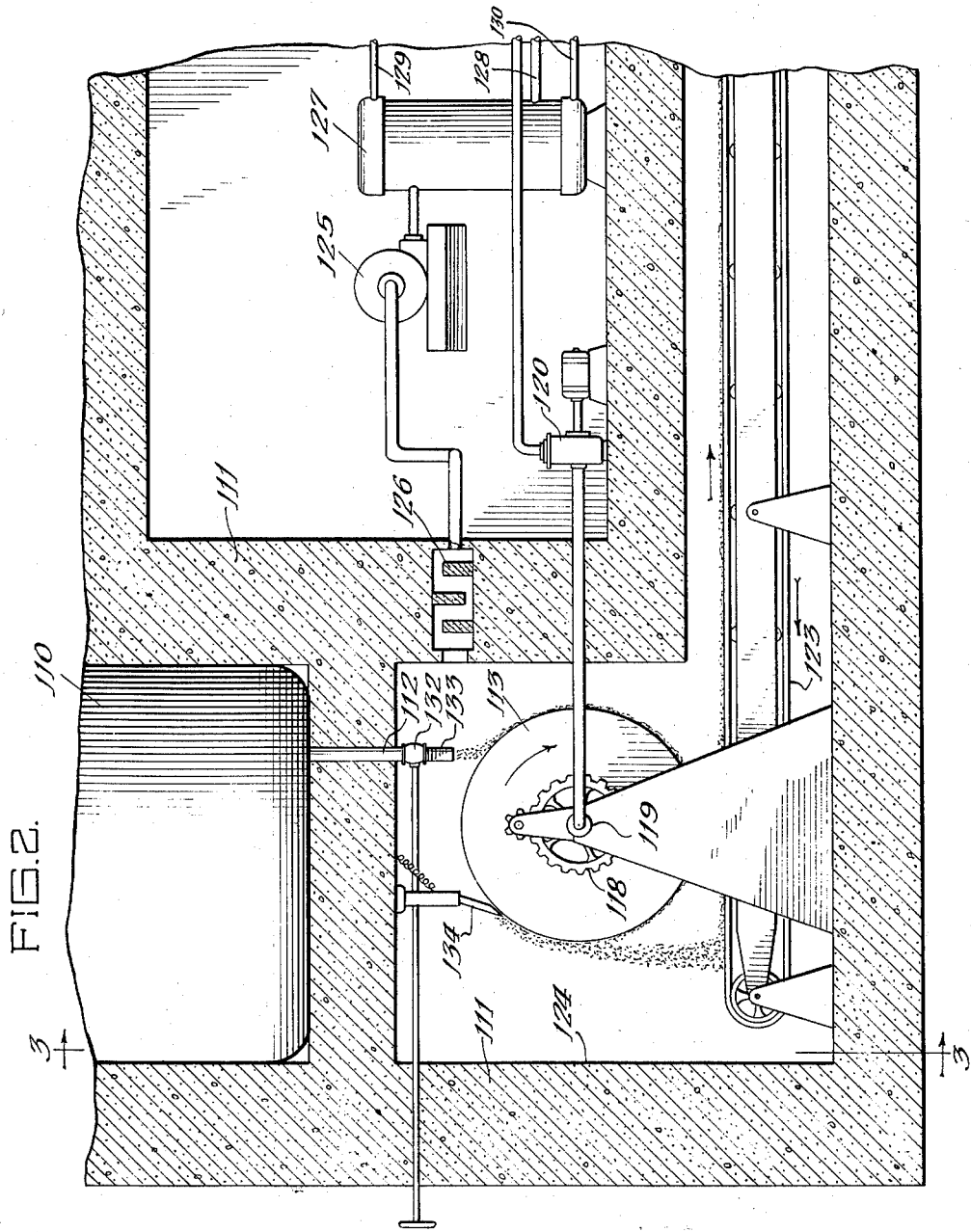
Fig. 2 is a similar view of a second embodiment of the invention.
Figure 3:
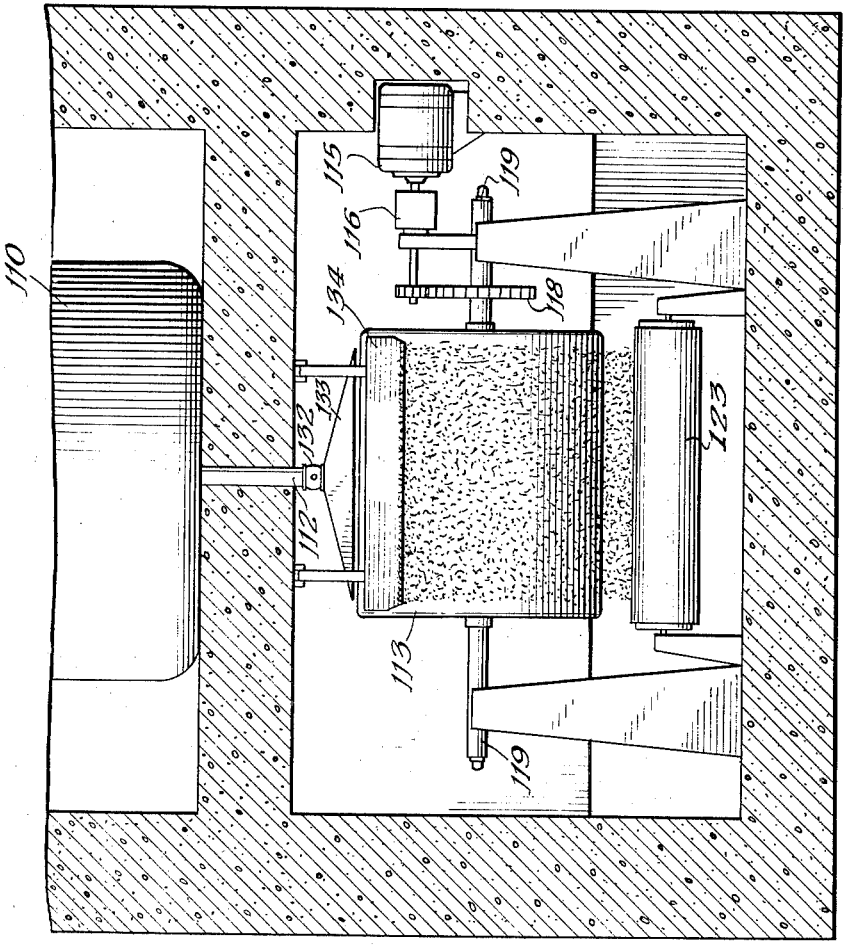
Fig. 3 is a vertical sectional view taken on the line 3—3 of Fig. 2, the view being partially in elevation.

A second type of separating apparatus embodying the invention is disclosed in Figs. 2 and 3. The parts of this apparatus similar to the parts of the first described apparatus are identified with the same reference numbers plus 100.

The neutronic reactor tank 110 is surrounded and supported by a concrete shield 111. The irradiated slurry flows through outlet pipe 112, valve 132 and through the long, thin orifice of nozzle 133. Nozzle 133 spreads the slurry in a thin stream on a revolvable drum 113 that is revolved slowly by electric motor 115 through reduction gearing 116 and gears 118. The temperature of the drum 113 is controlled by a fluid circulated through the drum from central shaft 119 by pump 120.

A doctor blade 134 is mounted on the opposite side of the drum 113 from the nozzle 133 for scraping dried solid material from said drum; allowing it to fall in a thin layer on belt conveyor 123 which is mounted below said drum. The belt conveyor 123 then carries the dried solids to the next step in the plutonium separation process.

An exhaust pump 125 exhausts the air and vaporizes deuterium oxide from chamber 124, which surrounds the drum 113, through baffles 126 and into a condenser 127. Cooling liquid is circulated through condenser 127 through inlet pipe 129 and outlet pipe 130, and the liquid deuterium oxide leaves the condenser through outlet pipe 128 and is returned to the neutronic reactor tank 110 by means not shown.

The method of separation employing the drum-type apparatus is similar to that using the tube 13. The neutronic reactor is operated for the time necessary to achieve the desired concentration of plutonium. Drum 113 is preheated by passing superheated steam through shaft 119 or by other means. The valve 132 is then opened slightly allowing the irradiated slurry to flow in a thin layer onto the surface of the slowly revolving drum 113. The hot slurry solids on the drum surface vaporize the deuterium oxide that is exhausted by pump 125 and condensed in condenser 127, any entrained particles being trapped by baffles 126.

The hot solids remain on the drum 113 and are carried around to the doctor blade 134 which scrapes said solids off the drum surface onto conveyor 123. The heavy drum 113 is heated by the hot irradiated solids until it reaches a temperature of approximately 500° to 600° C. The circulation of the steam or other cooling fluid is then adjusted to maintain the drum 113 at approximately this temperature.

Many variations in the method and apparatus will be apparent to those skilled in the art. For example, though the example herein described contemplates the use of self-heating to drive off the deuterium oxide obviously this heat can be supplemented by artificial heating from an exterior source. The drawings are schematic and the description is meant to be illustrative only. While the theories set forth are based on the best presently known experimental evidence, later discovered evidence may change said theories. The invention of a method and means of separating irradiated solids by means of the radioactive self-heating of said solids should be limited only by the appended claims.

What is claimed is:

1. A neutronic reaction system comprising, in combination, a neutronic reactor provided with a tank containing a dispersion of thermal neutron fissionable material in a liquid moderator, an evaporation chamber, a duct connecting the evaporation chamber and the tank of the reactor, a valve disposed in the duct between the tank and the chamber, means for reducing the pressure within the chamber, a conveyor at least partially disposed within the evaporation chamber to remove solid residue therefrom, and means to cool the chamber to maintain the temperature of the solid residue therein below combustion temperature.

2. The apparatus of claim 1 wherein the conveyor comprises a screw provided with a hollow shaft, and the means to cool the chamber includes means to pump a fluid coolant connected to the hollow shaft of the conveyor.

3. The apparatus of claim 1 wherein the conveyor comprises a belt conveyor, and the cooling means comprises a rotating drum disposed about the belt conveyor and pumping means coupled to the drum for flowing a fluid coolant therethrough.

References Cited in the file of this patent

UNITED STATES PATENTS

| | | |
|---|---|---|
| 353,966 | Rathbun | Dec. 7, 1886 |
| 1,146,776 | Wallmann | July 13, 1915 |
| 1,751,127 | Cantieny | Mar. 18, 1930 |
| 1,908,256 | Kazmann | May 9, 1933 |
| 2,179,080 | Alther | Mar. 31, 1936 |
| 2,218,279 | Clayton | Oct. 15, 1940 |
| 2,245,536 | Thurman | June 10, 1941 |
| 2,270,182 | Collings et al. | Jan. 13, 1942 |
| 2,316,670 | Colgate et al. | Apr. 13, 1943 |

FOREIGN PATENTS

| | | |
|---|---|---|
| 114,150 | Australia | May 2, 1940 |
| 861,390 | France | Oct. 28, 1940 |
| 233,011 | Sweden | Oct. 2, 1944 |

OTHER REFERENCES

Kelly et al.: Phy. Rev. 73, 1135–9 (1948). (Copy in Patent Office Library.)